US006975319B1

(12) United States Patent
Donovan et al.

(10) Patent No.: US 6,975,319 B1
(45) Date of Patent: Dec. 13, 2005

(54) SYSTEM, METHOD AND ARTICLE OF MANUFACTURE FOR CALCULATING A LEVEL OF DETAIL (LOD) DURING COMPUTER GRAPHICS PROCESSING

(75) Inventors: Walter E. Donovan, Milpitas, CA (US); John Montrym, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 09/535,045

(22) Filed: Mar. 24, 2000

(51) Int. Cl.$^7$ ............................................. G06T 17/00
(52) U.S. Cl. ...................... 345/428; 345/422; 345/581; 345/586; 345/587
(58) Field of Search ..................... 345/428, 587, 345/582, 426, 438, 420, 419, 422, 581, 586

(56) References Cited

U.S. PATENT DOCUMENTS

| | | | | |
|---|---|---|---|---|
| 5,710,876 A | * | 1/1998 | Peercy et al. ................ | 345/426 |
| 5,986,663 A | * | 11/1999 | Wilde .......................... | 345/428 |
| 6,034,691 A | * | 3/2000 | Aono et al. .................. | 345/582 |
| 6,078,335 A | * | 6/2000 | Wong et al. ................. | 345/582 |
| 6,097,397 A | * | 8/2000 | Lee ............................. | 345/586 |
| 6,100,898 A | * | 8/2000 | Malamy et al. ............. | 345/588 |
| 6,222,555 B1 | * | 4/2001 | Christofferson et al. .... | 345/428 |
| 6,297,834 B1 | * | 10/2001 | Malzbender ................ | 345/586 |
| 6,559,853 B1 | * | 5/2003 | Hashimoto et al. ......... | 345/582 |
| 6,639,597 B1 | * | 10/2003 | Zwicker et al. ............. | 345/427 |

OTHER PUBLICATIONS

Lance Williams; "Pyramidal Parametrics"; Jul. 1983; Computer Graphics, vol. 17. No. 3 Computer Graphics Laboratory, New York Institute of Technology, Old Westbury, N.Y.; pp 1-11.

James F. Blinn et al., "Texture and Reflection in Computer Generated Images"; Oct. 1976; Graphics and Image Processing; Association for Computing Machinery, Inc. pp 542-547.

Ned Greene, New York Institute of Technology; "Environment Mapping and Other Applications of World Projections"; Nov. 1986; The Institute of Electrical and Electronics Engineers Inc. Computer Society; pp 21-29.

Voorhies, Douglas et al.; "Reflection Vector Shading Hardware" Computer Graphics Processings, Annual Conference Series, 1994.

* cited by examiner

*Primary Examiner*—Kimbinh T. Nguyen
(74) *Attorney, Agent, or Firm*—Zilka-Kotab, PC (57) ABSTRACT

A system, method and article of manufacture are provided for calculating a level of detail (LOD) value for use during computer graphics processing. First, a plurality of geometrically arranged coordinates is identified. A distance value is computed based on the geometrically arranged coordinates. A LOD value is then calculated using the distance value for use during computer graphics processing. In one embodiment, a derivative value is estimated based on the geometrically arranged coordinates, and the distance value is computed based on the derivative value.

21 Claims, 6 Drawing Sheets

SYSTEM, METHOD AND ARTICLE OF MANUFACTURE FOR CALCULATING A LEVEL OF DETAIL (LOD) DURING COMPUTER GRAPHICS PROCESSING

FIELD OF THE INVENTION

The present invention relates to computer graphics, and more particularly to determining the level of detail (LOD) for texture mapping during computer graphics processing.

BACKGROUND OF THE INVENTION

Recent advances in computer performance have enabled graphic systems to provide more realistic graphical images using personal computers and home video game computers. In such graphic systems, some procedure must be implemented to "render" or draw graphic primitives to the screen of the system. A "graphic primitive" is a basic component of a graphic picture, such as a polygon, e.g., a triangle, or a vector. All graphic pictures are formed with combinations of these graphic primitives. Many procedures may be utilized to perform graphic primitive rendering.

Early graphic systems displayed images representing objects having extremely smooth surfaces. That is, textures, bumps, scratches, or other surface features were not modeled. In order to improve the quality of the image, texture mapping was developed to model the complexity of real world surface images. In general, texture mapping is the mapping of an image or a function onto a surface in three dimensions. Texture mapping is a relatively efficient technique for creating the appearance of a complex image without the tedium and the high computational cost of rendering the actual three dimensional detail that might be found on a surface of an object.

Many parameters have been texture mapped in conventional systems. Some of these parameters include surface color, specular reflection, normal vector perturbation, specularity, transparency, diffuse reflections, and shadows. In texture mapping, a source image known as the "texture" is mapped onto a surface in three dimensional space. The three dimensional surface is then mapped to the destination image. The destination image is then displayed on a graphic display screen. Examples of the texture of an object include the gravel on a highway or scuff marks on a wooden surface.

One tool used during texture mapping is an environment map. An environment map is an image or collection of images which characterize the appearance of a scene when viewed from a particular position. Each type of environment map has an associated projection which is used to compute the appearance along a ray traveling in a particular direction towards the camera. Not all types of environment maps capture the scene in every direction.

A variety of different forms of environment maps have been used in the past. An orthographic projection of a reflecting sphere to characterize the illumination of a scene is described by Williams in "Pyramidal Parametrics", Computer Graphics, Vol. 17, No. 3, pgs. 1–11, July, 1983. The intention was to use the environment map as an aid to the rapid computation of specular reflections. In an article by Greene entitled "Environment Mapping and Order Applications of Worlds Projections", IEEE Computer Graphics and Applications, Vol. 6, No. 11, pgs. 21–49, November, 1986, six images on the faces of a cube are used for a "cubic environment map".

Due to some limitations, spherical environment mapping is challenging to do in real time, and produces artifacts. If the reflection vector is used as an index into a cubic environment map, one can avoid these artifacts since sphere map approximations can also be generated from a six-sided (or cube) environment map by using texture mapping to project the six cube faces onto a sphere. The six cube faces capture the environment color for all 3-D reflection directions without singularities.

During use of a cubic environment map, software renderers calculate a reflection vector for each pixel, and use this to index into an axis-aligned cube map, a latitude/longitude map, or a sin(latitude)/longitude map. The cubic environment map is a general table controlling what is reflected by the surface. Because the map is indexed by the reflection vector, specular spread functions can be incorporated into the maps themselves if they are based solely on the relative reflection angle, thus allowing highlighting, i.e. Phong highlighting.

Cubic environment mapping has proved effective because the eye gets a clear impression of surface curvature from the reflection's distortion of the environment image. Cubic environment maps express source illumination by direction alone. It is built upon texture mapping, which is becoming more common and comparable in performance to linear shading. For more information on the basics of environment mapping, reference may be made to Blinn, Jim and Newell, Martin. "Texture and Reflection in Computer Generated Images". Communications of the ACM, Vol. 19, No. 10 (1976), pp. 542–547.

Occasionally, when rendering an object using a cubic environment map, one texel, or texture element, will correspond directly to a single pixel that is displayed on a monitor. In this situation the level of detail (LOD) is defined to be equal to zero (0) and the texel is neither magnified nor minified. However, the displayed image can be a magnified or minified representation of the object. If the object is magnified, multiple pixels will represent a single texel. A magnified object corresponds to a negative LOD value. If the object is minified, a single pixel represents multiple texels. A minified object corresponds to a positive LOD value. In general, the LOD value roughly corresponds to the amount of the cubic environment map "covered" by a single pixel. The common convention is that each LOD is exactly half the size of the next higher-detail LOD, but LODs do not need to be restricted that way. Given that common convention, we then define the LOD number as the $\log_2$ of the texel to pixel scale ratio. Thus, LOD 0 means the pixel to texel scale is 1 to 1.

Figure 1:
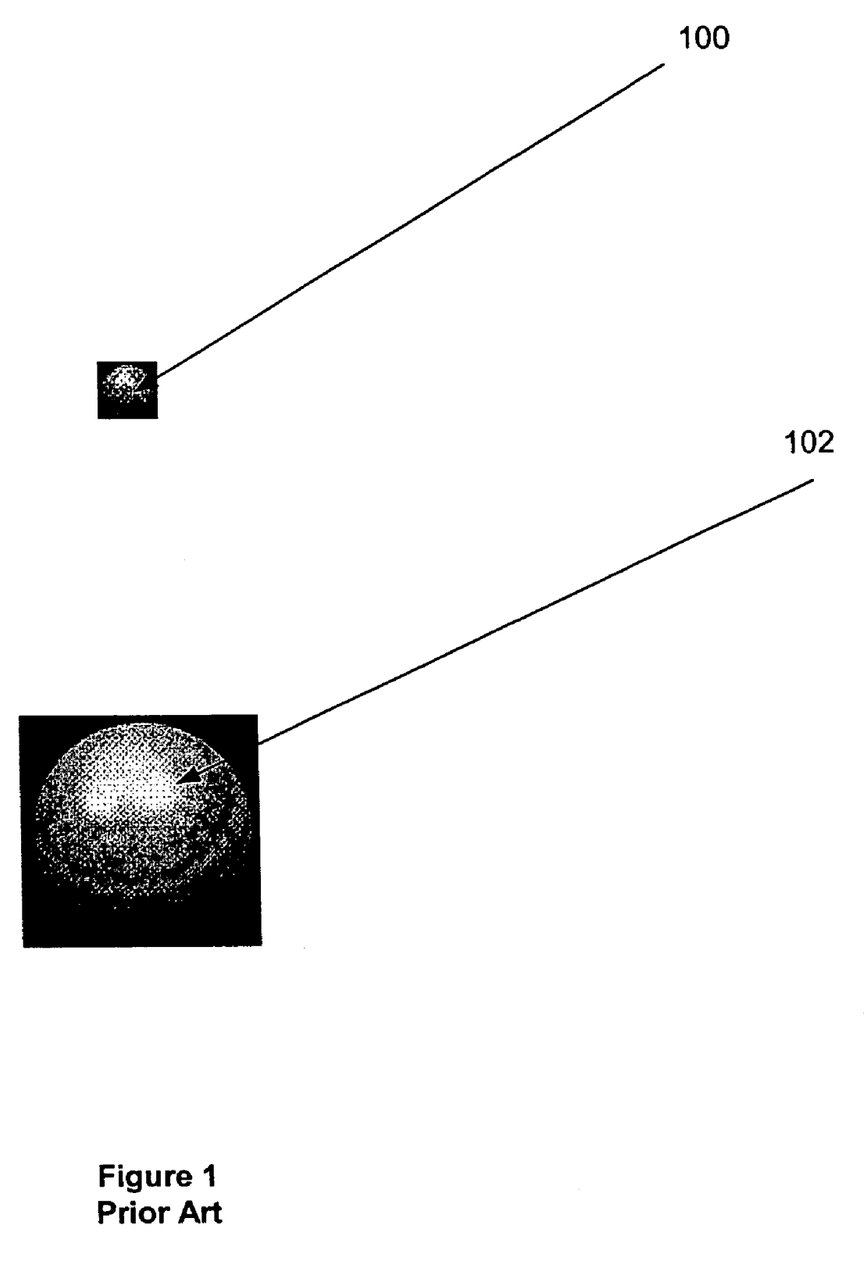
FIG. 1 illustrates a pair of graphical images having different level of detail (LOD) values.

The amount of detail stored in different LOD representations may be appreciated by drawing an analogy to the detail perceived by an observer while observing an object. For example, very little detail may be perceived by an observer while watching an automobile from a distance. On the other hand, several details such as doors, windows, mirrors will be perceived if the observer is sufficiently close to the automobile. A finer level LOD may include such additional details also. For example, in Prior Art FIG. 1, the top ball 100 is shown with a LOD that is 2 levels coarser than the bottom ball 102.

During texture mapping, conventional texture coordinates, i.e. s, t, r and q, are received and output coordinates, i.e. u, v, and p are outputted. From such outputted values, the LOD is calculated. One prior art method of calculating the LOD is set forth in Equation #1.

Equation #1

$$LOD = \log_2 LOD',$$

where $$LOD' = \max(u_x^2 + v_x^2 + p_x^2)^{1/2}, (u_y^2 + u_y^2 + p_y^2)^{1/2}$$

$$u_x = [\tilde{a}(u*q)/\tilde{a}x - u*\tilde{a}(q)/\tilde{a}x]/q$$

$$v_x = [\tilde{a}(v*q)/\tilde{a}x - v*\tilde{a}(q)/\tilde{a}x]/q$$

$$p_x = [\tilde{a}(p*q)/\tilde{a}x - p*\tilde{a}(q)/\tilde{a}x]/q$$

$$u_y = [\tilde{a}(u*q)/\tilde{a}y - u*\tilde{a}(q)/\tilde{a}y]/q$$

$$v_y = [\tilde{a}(v*q)/\tilde{a}y - v*\tilde{a}(q)/\tilde{a}y]/q$$

$$p_y = [\tilde{a}(p*q)/\tilde{a}y - p*\tilde{a}(q)/\tilde{a}y]/q$$

As shown in Equation #1, differentiation is required to calculate the LOD. Such calculation is extremely time consuming, and may not be suitable for certain hardware. It is desirable to provide fast and simple circuits and methods for determining the LOD so that texture mapping can be performed fast in real time.

There is therefore a need for a system that allows for more efficient LOD calculation during the texture mapping process.

DISCLOSURE OF THE INVENTION

A system, method and article of manufacture are provided for calculating a level of detail (LOD) value for use during computer graphics processing. First, a plurality of geometrically arranged coordinates is identified. A distance value is computed based on the geometrically arranged coordinates. A LOD value is then calculated using the distance value for use during computer graphics processing. In one embodiment, a derivative value is estimated based on the geometrically arranged coordinates, and the distance value is computed based on the derivative value. Such numerical solution provides a more efficient LOD calculation as opposed to alternative analytical methods.

In one embodiment of the present invention, the geometrically arranged coordinates include $(z_0, z_1, z_2, z_3)$ which may take the form of texture coordinates $(u_0, u_1, u_2, u_3)$, texture coordinates $(v_0, v_1, v_2, v_3)$, or texture coordinates $(p_0, p_1, p_2, p_3)$. The geometrically arranged coordinates $(z_0, z_1, z_2, Z_3)$ may also be representative of a quadrilateral with $z_0$ being an upper left corner of the quadrilateral, $z_1$ being an upper right corner of the quadrilateral, $z_2$ being a lower left corner of the quadrilateral, and $z_3$ being a lower right corner of the quadrilateral. As an option, the quadrilateral may be a 2×2 pixel quadrilateral.

In another embodiment of the present invention, the derivative value is a derivative with respect to an x-axis. In such embodiment, the derivative value is calculated using the expression $((z_2-z_0)+(z_3-z_2))/2$. In an alternative embodiment, the derivative value is a derivative with respect to an y-axis. In such embodiment, the derivative value is calculated using the expression $((z_2-z_0)+(z_3-z_1))/2$.

In yet another embodiment of the present invention, the geometrically arranged coordinates are transformed into a different coordinate system (l,m,n). The distance value is then estimated using an expression selected from the group of $(I_1-I_0)^2+(m_1-m_0)^{2+}(n_1-n_0)^2$, $(I_2-I_0)^2+(m_2-m_0)^2+(n_2-n_0)^2$, $(I_3-I_1)^2+(m_3-m_1)^2+(n_3-n_1)^2$, and $(I_3-I_2)^2+(m_3-m_2)^2+(n_3-n_2)^2$.

In one aspect of the present invention, the LOD value is calculated during general texture mapping, programmable pixel shading, or during the use of dependent textures. In an alternative aspect, the LOD value may be calculated for cube environment mapping, or for any other purpose.

In the case where the geometrically arranged coordinates $(z_0, z_1, z_2, z_3)$ reside on separate sides of a cube map during cube environment mapping, measures may be carried out to prevent erroneous results. In particular, a coordinate space transform may be performed.

In yet another aspect of the present invention, it may be determined if the signs of the q-values of the pixels in the 2×2 quadrilateral are the same. If it is determined that the signs of the q-values of these pixels are not the same, the coordinate values are based in different half spaces and thus cannot be used to compute a correct LOD. As such, the LOD value may be set to infinity.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

DESCRIPTION OF THE PREFERRED EMBODIMENTS

A cubic environment map is a texture map or general table indexed by a three-dimensional vector. If the indexing vector is a reflection vector, for example, specular spread functions can be incorporated into the maps themselves if they are based solely on the relative reflection angle, thus allowing highlighting, i.e. Phong highlighting. Since such highlights are pre-computed, there is no rendering-time penalty for a high number of light sources. Indeed, maps can contain area lights or photographic environments, or any combination of these. In general, though, the indexing vector can be anything the application requires.

Figure 2:
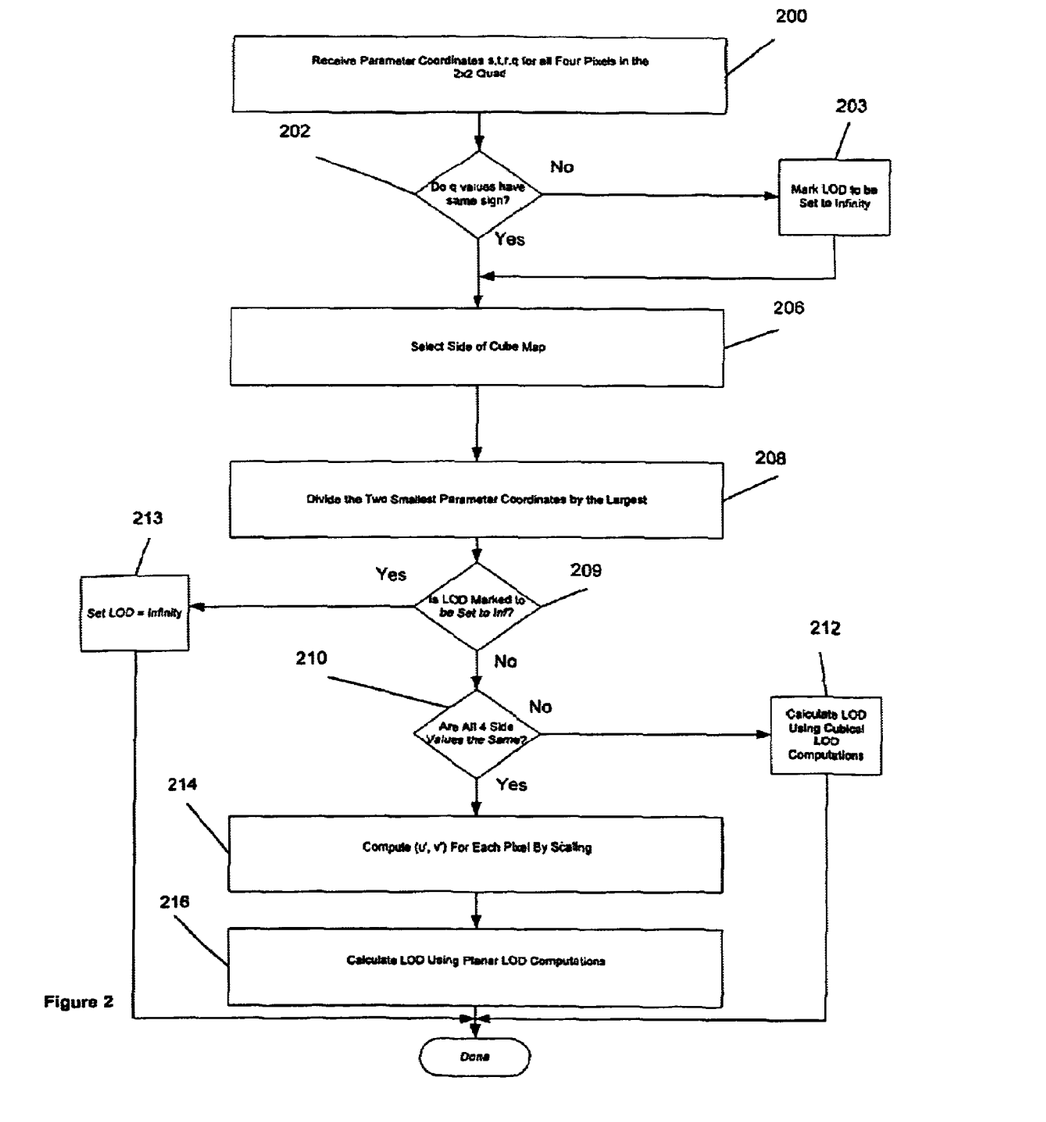
FIG. 2 illustrates a flowchart delineating the steps of calculating a level of detail (LOD) during the cube environment mapping process in accordance with one embodiment of the present invention.

FIG. 2 illustrates a flowchart delineating the steps of calculating a level of detail (LOD) during the cube environment mapping process. As is commonly known to those of ordinary skill in the art, such LOD is critical for determining the amount of a texture covered by a single pixel. As shown in FIG. 2, parameter coordinates (s,t,r,q) are first identified in operation 200. It should be noted that parameter coordinates (s,t,r,q) are received for four pixels which are situated in a 2×2 quadrilateral. In other words, there are four (s,t,r,q) quadruplets, or sixteen total values, identified in operation 200.

Such parameter coordinates (s,t,r,q) represent coordinates in the parametric coordinate space, which is widely known to those of ordinary skill in the art. In particular, parameter coordinates (s,t,r,q) are used to represent texture-size-independent homogeneous three dimensional texture coordinates.

It should be noted that the LOD computation of the present invention involves distances in pixels and thus requires working with texture coordinates (u, v, p). Texture coordinates (u, v, p) represent texture coordinates after scaling by the texture size and the homogeneous coordinate q. Specifically, u=(s/q)*width, etc.

Figure 2A:
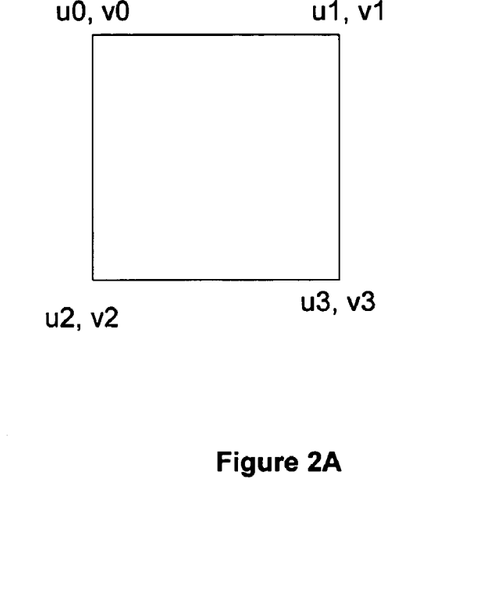
FIG. 2A is a diagram illustrating the geometrically arrangement of texture coordinates which in accordance with one embodiment of the present invention.

FIG. 2A is a diagram illustrating the geometrically arrangement of texture coordinates which, in the present description, may each be represented generally by the variable z. As shown, the coordinates may be representative of a quadrilateral, i.e. square, with $z_0$ being an upper left corner of the square, $z_1$ being an upper right corner of the square, $z_2$ being a lower left corner of the square, and $z_3$ being a lower right corner of the square.

The process continues by determining in decision 202 whether the q-values of the parameter coordinates each have the same sign. If it is determined that the pixels of the 2×2 pixel quad have the same q sign in decision 202, the parameter coordinate values represent points that come from the same half space (i.e., either in front of the eye or in back of the eye), and the process may continue. If the signs differ, however, then the parameter coordinate values are based in different half spaces and thus cannot be used to compute a correct LOD. In such case, it is observed that the parameter coordinate values are "infinitely far apart" and thus the LOD value is marked to be set to "infinity." Note operation 203. It should be noted that the LOD hardware checks for this case and executes accordingly.

Thereafter, in operation 206, a side of a cube map is selected. The selected side of the cube map is that which corresponds to the parameter coordinate with the highest absolute value. For example, if s were largest, and s>0, then the positive x side of the cube map would be selected. If two or more parameter coordinates have the same absolute value, a convention may be established to pick one or the other.

With continuing reference to FIG. 2, the two smaller parameter coordinates are then divided by the parameter coordinate having the largest absolute value. See operation 208. As a result, four triplets (s', t', side) are generated. By definition, s' and t' are in the range [−1.0, 1.0].

It is then determined in decision 209 whether the LOD value is marked to be set to infinity. If so, the LOD value is set to infinity in operation 213. If not, it is determined in decision 210 whether all four "side" values of the triplets are the same. If not, the LOD is calculated using a cubical LOD computation in operation 212. More information on such computation will be set forth in greater detail during reference to FIG. 4.

If, however, it is determined in decision 210 that all four side values of the triplets are the same, texture coordinates (u', v') are calculated using Equations #2 in operation 214. Since the range of s' and t' are in [−1.0, 1.0], and it is desired that u' and v' span the cube map side, then size is set equal to half the width or height of the largest LOD of the texture map comprising the selected cube map side. Thereafter, the LOD is calculated using a planar LOD computation, as indicated in operation 216. More information on such computation will be set forth in greater detail during reference to FIG. 3.

Equations #2

$$u' = s' * \text{size}$$
$$v' = t' * \text{size}.$$

Figure 3:
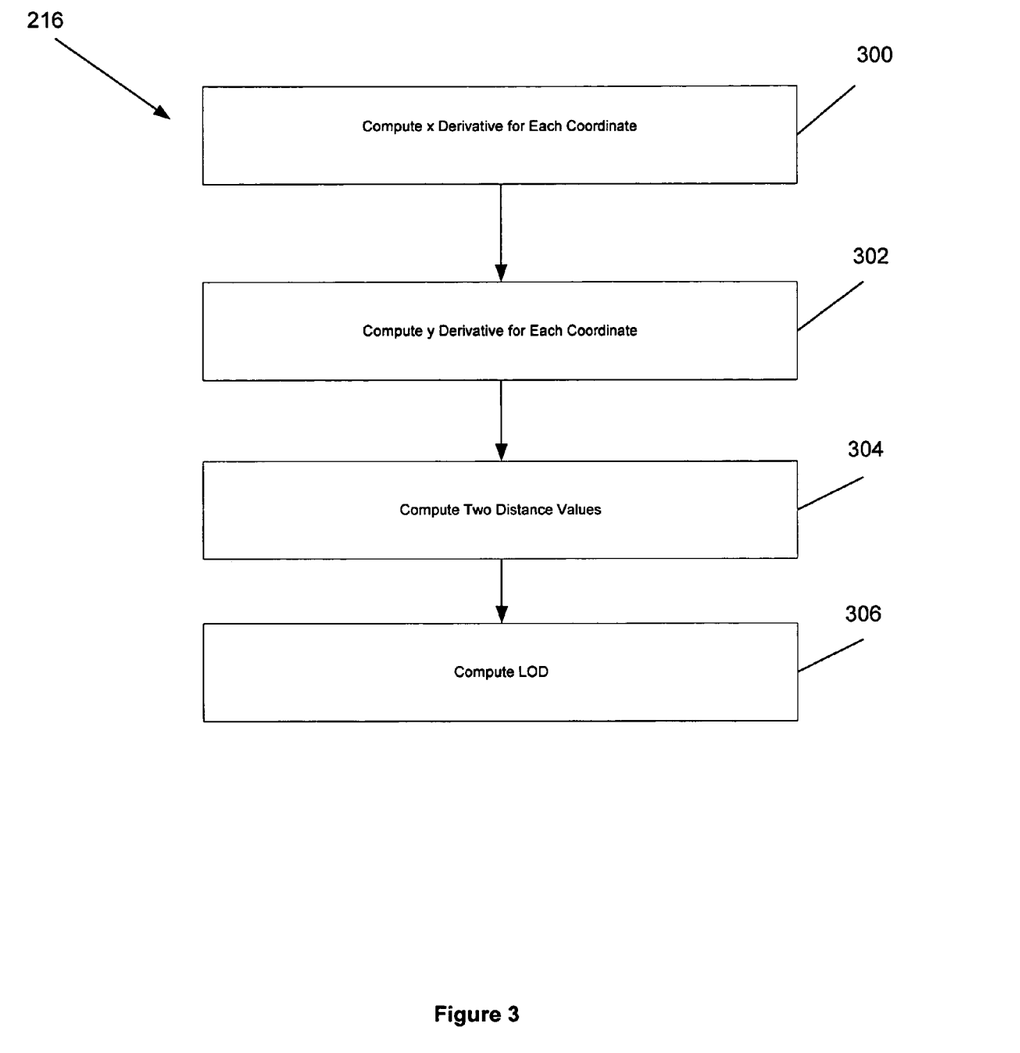
FIG. 3 is a flow diagram illustrating the detailed steps associated with calculating the LOD using planar computations in operation 216 of FIG. 2 in accordance with one embodiment of the present invention.

FIG. 3 is a flow diagram illustrating the detailed steps associated with calculating the LOD using planar computations in operation 216 of FIG. 2. As shown, in operation 300, an x derivative is calculated for each coordinate, i.e. $u_x$, $v_x$, $p_x$, etc. by differentiating the bilinear function which is shown in Equations #3.

Equations #3

$$z(x,y)=z_0*(1-x)*(1-y)+z_1*x*(1-y)+z_2*(-x)*y+z_3*x*y,$$

where $x = 0, y = 0$ at pixel 0

$x = 1, y = 0$ at pixel 1

$x = 0, y = 1$ at pixel 2

$x = 1, y = 1$ at pixel 3.

The x derivative is calculated for each coordinate, i.e. $u_x$, $v_x$, $p_x$, etc using Equations #4.

Equations #4

$$u'_x = ((u_1 - u_0) + (u_3 - u_2))/2$$
$$v'_x = ((v_1 - v_0) + (v_3 - v_2))/2$$
$$p'_x = ((p_1 - p_0) + (p_3 - p_2))/2$$

In operation 302, a y derivative is calculated for each coordinate, i.e. $u_y$, $v_y$, $p_y$, etc. by differentiating the bilinear function described above. See Equations #5.

Equations #5

$$u'_y = ((u_2 - u_0) + (u_3 - u_1))/2$$
$$v'_y = ((v_2 - v_0) + (v_3 - v_1))/2$$

-continued $$p'_y = ((p_2 - p_0) + (p_3 - p_1))/2$$

Next, in operation 304, two distance values, $d_x$ and $d_y$, are computed, as set forth in Equations #6.

Equations #6

$$d_x = u_x^2 + v_x^2 + p_x^2$$
$$d_y = u_y^2 + v_y^2 + p_y^2$$

Finally, in operation 306, the two distance values, $d_x$ and $d_y$, are used to compute the LOD. This is accomplished using Equation #7. Such numerical solution provides a more efficient LOD calculation as opposed to alternative analytical methods.

Equation #7

$$LOD = \pm 2 \log_2 (\max (d_x, d_y))$$

Figure 4:
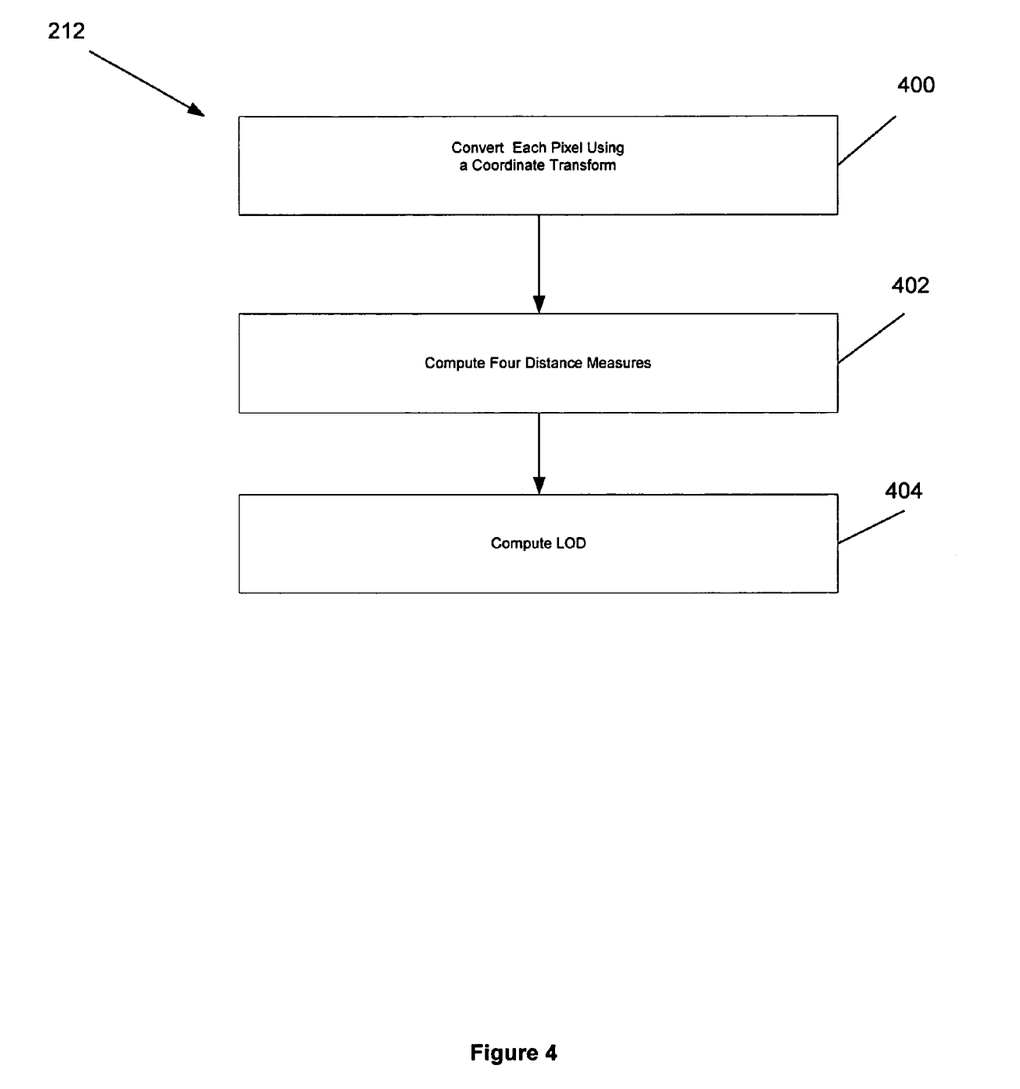
FIG. 4 is a flow diagram illustrating the detailed steps associated with calculating the LOD using cubic computations in operation 212 of FIG. 2 in accordance with one embodiment of the present invention.

FIG. 4 is a flow diagram illustrating the detailed steps associated with calculating the LOD value using cubic computations in operation 212 of FIG. 2. First, in operation 400, the values (s', t', side) from operation 208 of FIG. 2 are converted to a different coordinate system (l,m,n) using a coordinate transform. An exemplary coordinate transform is shown in Table 1.

Figure 4A:
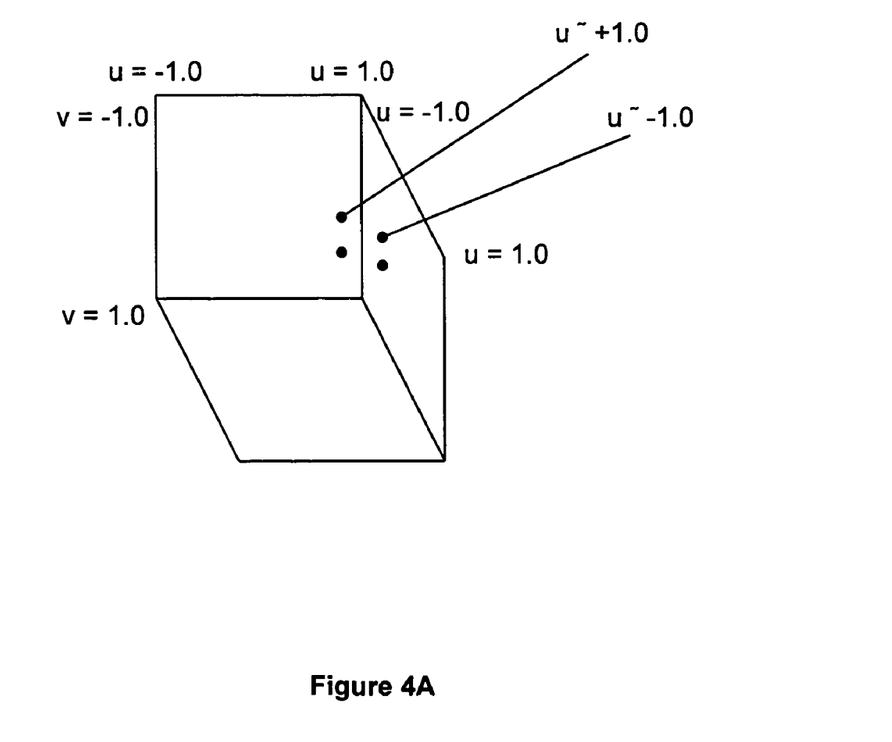
FIG. 4A illustrates a cube map where the geometrically arranged texture coordinates reside on separate sides of the cube map.

FIG. 4A illustrates the criticality of performing the transform of operation 400. As shown, a cube map has geometrically arranged texture coordinates that reside on separate sides of the cube map. Due to the negative texture coordinate values of one side of the cube map with respect to the other, erroneous results would occur from their use during the LOD calculation.

TABLE 1

```
void coord_transform(float s, float t, int side, float *1,
float *m float *n)
{
    assert (width==height) ;
    float size = width/2.0;
    float u = s * size;
    float v = t * size;
    switch (side)
    {
    case CUBE_NEGX:
        *1=-size; *m= v; *n= u;
        break;
    case CUBE_POSX:
        *1= size; *m= v; *n= u;
        break;
    case CUBE_NEGY:
        *1= u; *m=-size; *n= v;
        break;
    case CUBE_POSY:
        *1= u; *m= size; *n= v;
        break;
    case CUBE_NEGZ:
        *1=-u; *m= v; *n=-size;
        break;
    case CUBE_POSZ:
        *1= u; *m= v; *n= size;
        break;
    }
}
```

Note that for this coordinate transformation to be successful, the two dimensional texture maps representing each side of the cubic environment map are restricted so that each side is square, and all maps are the same size. Thus a single "side" value can be used to represent all six texture maps.

Next, in operation 402, four distance measures, $d_{01}$, $d_{02}$, $d_{13}$, $d_{23}$, are each calculated. Such is accomplished using Equations #8.

Equations #8

$$d_{01} = (l_1 - l_0)^2 + (m_1 - m_0)^2 + (n_1 - n_0)^2$$
$$d_{02} = (l_2 - l_0)^2 + (m_2 - m_0)^2 + (n_2 - n_0)^2$$
$$d_{13} = (l_3 - l_1)^2 + (m_3 - m_1)^2 + (n_3 - n_1)^2$$
$$d_{23} = (l_3 - l_2)^2 + (m_3 - m_2)^2 + (n_3 - n_2)^2$$

Finally, the four distance measures, $d_{01}$, $d_{02}$, $d_{13}$, $d_{23}$, are used to compute the LOD. This is done using Equations #9. It should be noted that such numerical solution provides a more efficient LOD calculation as opposed to alternative analytical methods.

Equations #9

$$LOD = \frac{1}{2} \log_2 (\max (d_{01}, d_{02}, d_{13}, d_{23}))$$

In the present description, the LOD value is calculated in the context of cube environment mapping. It should be noted, however, that the LOD value may also be calculated in the foregoing manner during general texture mapping, during the use of dependent textures, programmable pixel shaders where texture coordinates are generated, or for any other purpose.

A dependent texture is a texture map or general table indexed, at least once, by a function of a value looked up on a texture map or general table. Specifically, where a non-dependent texture look-up can be represented by Equation #10, Equation #10

Pixel_value=texture_map(u, v, p)

a dependent texture look-up can be represented by Equation #11.

Equation #11

Pixel_value=texture_map(function(texture_map(u, v, p)))

It should be noted that the number of texture map look-ups inclusive in a dependent texture is not limited to the two above, but can be iterated to as many stages as needed.

Figure 5:
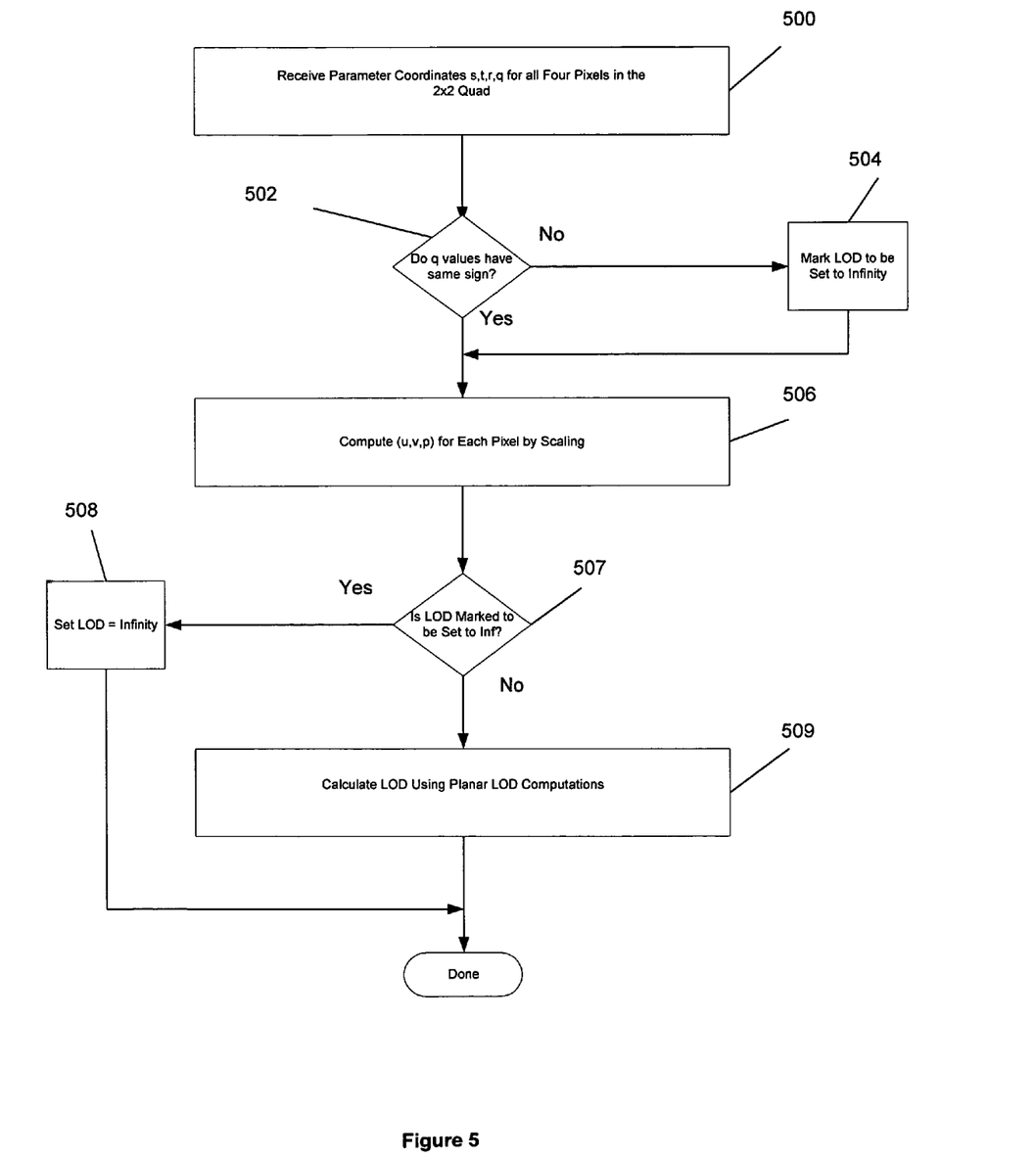
FIG. 5 illustrates a flowchart delineating the steps of calculating a level of detail (LOD) in association with dependent texture and any other type of computer graphics processing.

FIG. 5 illustrates a flowchart delineating the steps of calculating a level of detail (LOD) in association with dependent textures and any other type of computer graphics processing. As shown in FIG. 5, parameter coordinates (s,t,r,q) of a 2×2 pixel quadrilateral are first received in operation 500. Such operation is similar to that of operation 200 of FIG. 2.

In decision 502, it is determined whether the q-values of the parameter coordinates each have the same sign. If it is determined that the pixels of the 2×2 pixel quad have the same q sign in decision 502, it is observed that the parameter coordinate values are "infinitely far apart" and thus the LOD value is marked to be set to "infinity." Note operation 504.

Thereafter, in operation 506, texture coordinates (u,v,p) are calculated by scaling the texture width, height and depth, respectively. It should be noted that these values are not limited to three dimensions. If associated hardware supports n dimensional lookups, then there would be n texture coordinates used during the use of the present invention. In the present description, three dimensions are assumed to clarify the presentation.

It is then determined in decision 507 whether the LOD value is marked to be set to infinity. If so, the LOD value is set to infinity in operation 508. If not, the LOD is calculated using a planar LOD computation, as indicated in operation 509. It should be noted that such computations are those previously set forth in FIG. 3.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for calculating a level of detail (LOD) value for use during computer graphics processing, comprising:
computing a distance value based on geometrically arranged coordinates; and
calculating a LOD value using the distance value for use during computer graphics processing;
wherein the distance value is computed based on a derivative value;
wherein the geometrically arranged coordinates include $(z_0, z_1, z_2, z_3)$ which are representative of a quadrilateral;
wherein the derivative value is calculated using the expression $((z_1-z_0)+(z_3-z_2))/2$.

2. The method as recited in claim 1, wherein the geometrically arranged coordinates include $(z_0, z_1, z_2, z_3)$ with $z_0$ being an upper left corner of the quadrilateral, $z_1$ being an upper right corner of the quadrilateral, $z_2$ being a lower left corner of the quadrilateral, $z_3$ being a lower right corner of the quadrilateral.

3. The method as recited in claim 2, wherein the quadrilateral is a 2×2 pixel quadrilateral.

4. The method as recited in claim 2, wherein the derivative value is a derivative with respect to an x-axis.

5. A method for calculating a level of detail (LOD) value for use during computer graphics processing, comprising:
identifying a plurality of geometrically arranged coordinates;
computing a distance value based on the geometrically arranged coordinates;
calculating a LOD value using the distance value for use during computer graphics processing; and
estimating a derivative value based on the geometrically arranged coordinates, wherein the distance value is computed based on the derivative value;
wherein the geometrically arranged coordinates include $(z_0, z_1, z_2, z_3)$ which are representative of a quadrilateral with $z_0$ being an upper left corner of the quadrilateral, $z_1$ being an upper right corner of the quadrilateral, $Z_2$ being a lower left corner of the quadrilateral, $z_3$ being a lower right corner of the quadrilateral;
wherein the derivative value is a derivative with respect to an x-axis;
wherein the derivative value is calculated using the expression $((z_1-z_0)+(z_3-z_2))/2$.

6. A method for calculating a level of detail (LOD) value for use during computer graphics processing, comprising:
identifying a plurality of geometrically arranged coordinates;
computing a distance value based on the geometrically arranged coordinates;
calculating a LOD value using the distance value for use during computer graphics processing; and
estimating a derivative value based on the geometrically arranged coordinates, wherein the distance value is computed based on the derivative value;
wherein the geometrically arranged coordinates include $(z_0, z_1, z_2, z_3)$ which are representative of a quadrilateral with $z_0$ being an upper left corner of the quadrilateral, $z_1$ being an upper right corner of the quadrilateral, $z_2$ being a lower left corner of the quadrilateral, $z_3$ being a lower right corner of the quadrilateral;
wherein the derivative value is a derivative with respect to an y-axis;
wherein derivative value is calculated using the expression $((z_2-z_0)+(z_3-z_1))/2$.

7. A method for calculating a level of detail (LOD) value for use during computer graphics processing, comprising:
identifying a plurality of geometrically arranged coordinates;
computing a distance value based on the geometrically arranged coordinates;
calculating a LOD value using the distance value for use during computer graphics processing; and
estimating a derivative value based on the geometrically arranged coordinates, wherein the distance value is computed based on the derivative value;
wherein the LOD value is calculated for dependent textures.

8. A method for calculating a level of detail (LOD) value for use during computer graphics processing, comprising:
identifying a plurality of geometrically arranged coordinates;
computing a distance value based on the geometrically arranged coordinates; and
calculating a LOD value using the distance value for use during computer graphics processing;
wherein the LOD value is calculated for cube environment mapping which involves calculating a vector, and using the vector to index into a sin(latitude)/longitude map.

9. A method for calculating a level of detail (LOD) value for use during computer graphics processing, comprising:
identifying a plurality of geometrically arranged coordinates;
computing a distance value based on the geometrically arranged coordinates;
calculating a LOD value using the distance value for use during computer graphics processing;
determining if the geometrically arranged coordinates reside on separate sides of a cube map; and
performing a coordinate space transform if the geometrically arranged coordinates reside on separate sides of the cube map.

10. A method for calculating a level of detail (LOD) value for use during computer graphics processing, comprising:

identifying a plurality of geometrically arranged coordinates;

computing a distance value based on the geometrically arranged coordinates;

calculating a LOD value using the distance value for use during computer graphics processing; and determining if a sign of a q-value of a pixel associated with each coordinate is the same.

11. The method as recited in claim 10, and further comprising setting the LOD value to infinity if it is determined that the sign of the q-value of each pixel is not the same.

12. A method for calculating a level of detail (LOD) value for use during computer graphics processing, comprising:

identifying a plurality of geometrically arranged coordinates;

computing a distance value based on the geometrically arranged coordinates;

calculating a LOD value using the distance value for use during computer graphics processing; and transforming the geometrically arranged coordinates to a different coordinate system (l,m,n), wherein the distance value is estimated using an expression selected from the group of $(l_1-l_0)^2+(m_1-m_0)^2+(n_1-n_0)^2$, $(l_2-l_0)^2+(m_2-m_0)^2+(n_2-n_0)^2$, $(l_3-l_1)^2+(m_3-m_1)^2+(n_3-n_1)^2$, and $(l_3-l_2)^2+(m_3-m_2)^2+(n_3-n_2)^2$.

13. A method for calculating a level of detail (LOD) value for use during computer graphics processing, comprising:

identifying a plurality of geometrically arranged coordinates;

computing a distance value based on the geometrically arranged coordinates;

calculating a LOD value using the distance value for use during computer graphics processing; and transforming the geometrically arranged coordinates to a different coordinate system (l,m,n), wherein the distance value is estimated using an expression selected from the group of $(l_1-l_0)^2+(m_1-m_0)^2+(n_1-n_0)^2$, $(l^2-l_0)^2+(m_2-m_0)^2+(n_2-n_0)^2$ $(l_3-l_1)^2+(m_3-m_2)^2+(n_3-n_1)^2$, and $(l_3-l_2)^2+(m_3-m_2)^2+(n_3-n_2)^2$;

wherein the geometrically arranged coordinates include $(z_0, z_1, z_2, z_3)$ which are representative of a quadrilateral with $z_0$ being an upper left corner of the quadrilateral, $z_1$ being an upper right corner of the quadrilateral, $z_2$ being a lower left corner of the quadrilateral, $z_3$ being a lower right corner of the quadrilateral.

14. A computer program embodied on a computer readable medium for calculating a level of detail (LOD) value for use during computer graphics processing, comprising:

a code segment for identifying a plurality of geometrically arranged coordinates;

a code segment for computing a distance value based on the geometrically arranged coordinates;

a code segment for calculating a LOD value using the distance value for use during computer graphics processing; and a code segment for estimating a derivative value based on the geometrically arranged coordinates, wherein the distance value is computed based on the derivative value;

wherein the geometrically arranged coordinates include $(z_0, z_1, z_2, z_3)$ which are representative of a quadrilateral with $z_0$ being an upper left corner of the quadrilateral, $z_1$ being an upper right corner of the quadrilateral, $z_2$ being a lower left corner of the quadrilateral, $z_3$ being a lower right corner of the quadrilateral;

wherein the derivative value is a derivative with respect to an x-axis;

wherein the derivative value is calculated using the expression $((z_1-z_0)+(z_3-z_2))/2$.

15. A computer program embodied on a computer readable medium for calculating a level of detail (LOD) value for use during computer graphics processing, comprising:

a code segment for identifying a plurality of geometrically arranged coordinates;

a code segment for computing a distance value based on the geometrically arranged coordinates;

a code segment for calculating a LOD value using the distance value for use during computer graphics processing; and a code segment for estimating a derivative value based on the geometrically arranged coordinates, wherein the distance value is computed based on the derivative value;

wherein the geometrically arranged coordinates include $(z_0, z_1, z_2, z_3)$ which are representative of a quadrilateral with $z_0$ being an upper left corner of the quadrilateral, $z_1$ being an upper right corner of the quadrilateral, $z_2$ being a lower left corner of the quadrilateral, $z_3$ being a lower right corner of the quadrilateral;

wherein the derivative value is a derivative with respect to an y-axis;

wherein derivative value is calculated using the expression $((z_2-z_0)+(z_3-z_1))/2$.

16. A computer program embodied on a computer readable medium for calculating a level of detail (LOD) value for use during computer graphics processing, comprising:

a code segment for identifying a plurality of geometrically arranged coordinates;

a code segment for computing a distance value based on the geometrically arranged coordinates; and a code segment for calculating a LOD value using the distance value for use during computer graphics processing;

wherein the LOD value is calculated for dependent textures.

17. A computer program embodied on a computer readable medium for calculating a level of detail (LOD) value for use during computer graphics processing, comprising:

a code segment for identifying a plurality of geometrically arranged coordinates;

a code segment for computing a distance value based on the geometrically arranged coordinates; and a code segment for calculating a LOD value using the distance value for use during computer graphics processing;

wherein the LOD value is calculated for cube environment mapping which involves calculating a vector, and using the vector to index a sin(latitude)/longitude map.

18. A computer program embodied on a computer readable medium for calculating a level of detail (LOD) value for use during computer graphics processing, comprising:

a code segment for identifying a plurality of geometrically arranged coordinates;

a code segment for computing a distance value based on the geometrically arranged coordinates;

a code segment for calculating a LOD value using the distance value for use during computer graphics processing;

a code segment for determining if the geometrically arranged coordinates reside on separate sides of a cube map; and a code segment for performing a coordinate space transform if the geometrically arranged coordinates reside on separate sides of the cube map.

19. A computer program embodied on a computer readable medium for calculating a level of detail (LOD) value for use during computer graphics processing, comprising:
- a code segment for identifying a plurality of geometrically arranged coordinates;
- a code segment for computing a distance value based on the geometrically arranged coordinates;
- a code segment for calculating a LOD value using the distance value for use during computer graphics processing; and
- a code segment for determining if a sign of a q-value of a pixel associated with each coordinate is the same.

20. The computer program as recited in claim 19, and further comprising a code segment for setting the LOD value to infinity if it is determined that the sign of the q-value of each pixel is not the same.

21. A computer program embodied on a computer readable medium for calculating a level of detail (LOD) value for use during computer graphics processing, comprising:
- a code segment for identifying a plurality of geometrically arranged coordinates;
- a code segment for computing a distance value based on the geometrically arranged coordinates;
- a code segment for calculating a LOD value using the distance value for use during computer graphics processing; and
- a code segment for transforming the geometrically arranged coordinates to a different coordinate system $(l,m,n)$, wherein the distance value is estimated using an expression selected from the group of $(l_1-l_0)^2+(m_1-m_0)^2+(n_1-n_0)^2$, $(l_2-l_0)^2+(m_2-m_0)^2+(n_2-n_0)^2$, $(l_3-l_1)^2+(n_3-n_1)^2+(n_3-n_1)^2$, and $(l_3-l_2)^2+(m_3-m_2)^2+(n_3-n_2)^2$;

wherein the geometrically arranged coordinates include $(z_0, z_1, z_2, z_3)$ which are representative of a quadrilateral with $z_0$ being an upper left corner of the quadrilateral, $z_1$ being an upper right corner of the quadrilateral, $z_2$ being a lower left corner of the quadrilateral, $z_3$ being a lower right corner of the quadrilateral.

* * * * *

UNITED STATES PATENT AND TRADEMARK OFFICE
CERTIFICATE OF CORRECTION

PATENT NO. : 6,975,319 B1
APPLICATION NO. : 09/535045
DATED : December 13, 2005
INVENTOR(S) : Donovan et al.

It is certified that error appears in the above-identified patent and that said Letters Patent is hereby corrected as shown below:

Col. 11, Claim 12, lines 24-26; replace "$(I_1 - I_0)^2 + (m_1 - m_0)^2 + (n_1 - n_0)^2, (I_2 - I_0)^2 + (m_2 - m_0)^2 + (n_2 - n_0)^2, (I_3 - I_1)^2 + (m_3 - m_1)^2 + (n_3 - n_1)^2,$ and $(I_3 - I_2)^2 + (m_3 - m_2)^2 + (n_3 - n_2)^2.$" with --$(l_1 - l_0)^2 + (m_1 - m_0)^2 + (n_1 - n_0)^2, (l_2 - l_0)^2 + (m_2 - m_0)^2 + (n_2 - n_0)^2, (l_3 - l_1)^2 + (m_3 - m_1)^2 + (n_3 - n_1)^2,$ and $(l_3 - l_2)^2 + (m_3 - m_2)^2 + (n_3 - n_2)^2.$--;

Col. 11, Claim 13, lines 38-40; replace "$(I_1 - I_0)^2 + (m_1 - m_0)^2 + (n_1 - n_0)^2, (I_2 - I_0)^2 + (m_2 - m_0)^2 + (n_2 - n_0)^2, (I_3 - I_1)^2 + (m_3 - m_2)^2 + (n_3 - n_1)^2,$ and $(I_3 - I_2)^2 + (m_3 - m_2)^2 + (n_3 - n_2)^2;$" with --$(l_1 - l_0)^2 + (m_1 - m_0)^2 + (n_1 - n_0)^2, (l_2 - l_0)^2 + (m_2 - m_0)^2 + (n_2 - n_0)^2, (l_3 - l_1)^2 + (m_3 - m_1)^2 + (n_3 - n_1)^2,$ and $(l_3 - l_2)^2 + (m_3 - m_2)^2 + (n_3 - n_2)^2;$--;

Col. 12, Claim 17, line 53; replace "index a" with --index into a--;

Col. 14, Claim 21, lines 11-14; replace "$(I_1 - I_0)^2 + (m_1 - m_0)^2 + (n_1 - n_0)^2, (I_2 - I_0)^2 + (m_2 - m_0)^2 + (n_2 - n_0)^2, (I_3 - I_1)^2 + (n_3 - n_1)^2 + (n_3 - n_1)^2,$ and $(I_3 - I_2)^2 + (m_3 - m_2)^2 + (n_3 - n_2)^2;$" with --$(l_1 - l_0)^2 + (m_1 - m_0)^2 + (n_1 - n_0)^2, (l_2 - l_0)^2 + (m_2 - m_0)^2 + (n_2 - n_0)^2, (l_3 - l_1)^2 + (m_3 - m_1)^2 + (n_3 - n_1)^2,$ and $(l_3 - l_2)^2 + (m_3 - m_2)^2 + (n_3 - n_2)^2;$--.

Signed and Sealed this
Nineteenth Day of March, 2013

Teresa Stanek Rea
*Acting Director of the United States Patent and Trademark Office*